Aug. 21, 1962   C. M. BOSWORTH   3,049,888
SEPARATION SYSTEMS
Filed Aug. 4, 1960
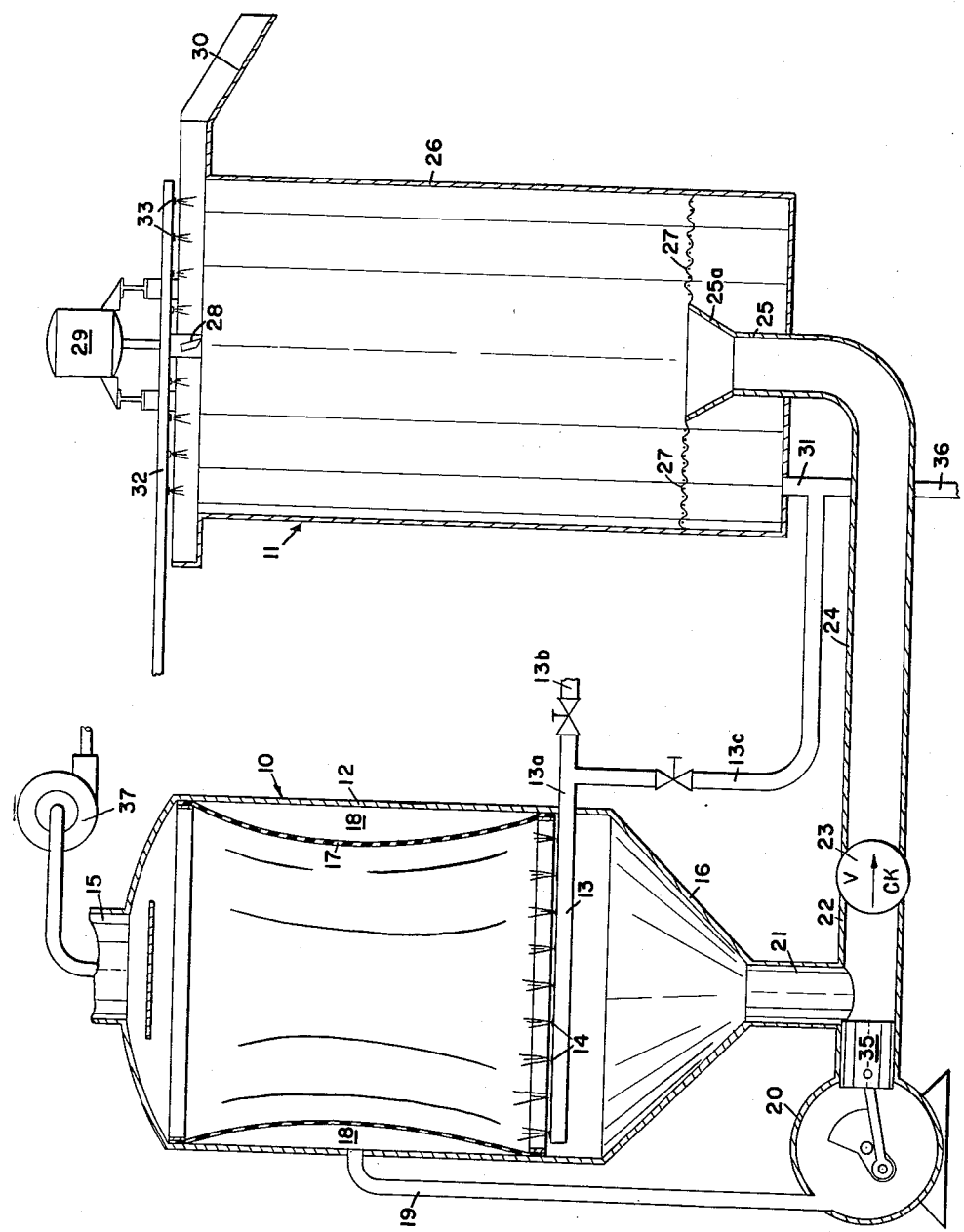
INVENTOR.
CYRUS M. BOSWORTH
BY Herman Seid
ATTORNEY.

United States Patent Office 3,049,888
Patented Aug. 21, 1962

3,049,888
SEPARATION SYSTEMS
Cyrus M. Bosworth, Syracuse, N.Y., assignor to Carrier Corporation, Syracuse, N.Y., a corporation of Delaware
Filed Aug. 4, 1960, Ser. No. 47,517
9 Claims. (Cl. 62—58)

This invention relates to the separation of solvent and solute components of a solution and more particularly to an improved method and apparatus for freezing a portion of the solvent component from a solution and an improved separation system and method of operating a separation column.

In the separation of solvent and solute components from a solution and more particularly in the separation of salt from saline water, various freeze processes and apparatus employing freeze processes have been proposed in the past. A number of suggestions embodying the direct freeze process for this purpose are now well known in the art. In a direct freeze process, a freezer vessel is evacuated and maintained slightly below the vapor pressure of a solution which is admitted to the freezer vessel. Solvent vapors which evaporate from the solution due to the reduced pressure within the freezer are continuously withdrawn thereby maintaining the desired pressure therein and removing large quantities of heat, which comprises the heat of vaporization of the solvent, from the vessel with the solvent vapor. Consequently, the solution in the freezer is thereby cooled. If the freezer vessel is continuously maintained at a pressure slightly below the vapor pressure of the solution, the solution will be cooled to the point that solvent will eventually freeze out of the solution forming a slurry of frozen solvent and liquid solution. This process is frequently referred to as vacuum freezing of the solution.

One of the difficulties which has been experienced in a vacuum freeze or direct freeze process has been the tendency of the solution within the freezer vessel to exhibit substantial metastability or in other words, to remain supersaturated or subcooled without freezing. A highly satisfactory solution to this problem has been described in application Serial No. 42,008 of C. M. Ashley and C. M. Bosworth, filed July 11, 1960, to which reference is made for a more complete description of a suitable direct freeze process to which this invention pertains. The solution to the problem of metastability therein described involves the introduction of solution into the freezer vessel through one or more upwardly directed nozzles which are submerged below the level of slurry or solution within the freezer vessel causing fountains of solution and frozen solvent to be projected upwardly in the freezer vessel. This construction results in presenting a substantial surface of solution to the reduced pressure within the freezer vessel and in addition substantially destroys the inherent metastability of the solution by reason both of the agitation of the solution in the fountain and its contact with crystals of the frozen solvent.

However, this as well as other freezers present additional problems in that a substantial quantity of frozen solvent tends to adhere to the sides of the freezer vessel. A build up of frozen solvent on the sides of the vessel impairs the operation of the freezer because of its tendency to collect additional frozen solvent and because of its tendency to interfere with the proper fountaining of solution and slurry upwardly in the interior of the vessel In addition, the net rate of production of frozen solvent is materially decreased because that frozen solvent which adheres to the sides of the freezer vessel is effectively lost from the process unless it can be dislodged from the wall of the vessel so that it falls back into the solution and becomes a part of the slurry therein. Furthermore, if a substantial mass of frozen solvent is suddenly dislodged from the wall of the freezer vessel, it may be carried through the outlet of the vessel into a slurry pump where it is likely to foul the operation of the pump necessitating shutdown of the entire system until the undesirably large chunk of ice can be broken up or melted.

An additional difficulty which is encountered in separation systems of the type described in the above referred to copending application is that of adequately separating the frozen solvent from the solution which has a tendency to adhere to the surfaces and in the interstices of the frozen solvent in a separation column. As described in the aforementioned application, this problem may be largely overcome by passing a washing fluid, preferably comprising substantially pure solvent material, in counterflow relation to the movement of frozen solvent through the separation column. This counterflow washing tends to replace solution adhering to the frozen solvent so as to provide a satisfactorily separated product from the separation column. However, to achieve this result, a substantial quantity of liquid solvent must be passed over the frozen solvent in the separation column and, while a substantial portion of the liquid solvent is recovered as product, the cost of pumping it to the separation column adversely effects the economy of the separation system as a whole. Where the product of the separation system is fresh water such as in a saline water recovery plant, for such a plant to be competitive with other sources of supply and commercially economical, it is necessary that pumping costs be reduced to an absolute minimum. It is, therefore, desirable to provide an improved washing system and process which requires a minimum of washing fluid while at the same time obtaining adequate separation of the solid and liquid components of the slurry fed through the separation column.

Accordingly, it is an object of this invention to provide an improved freezer vessel wherein the tendency of frozen solvent to permanently adhere to the sides of the vessel is materially reduced.

It is a further object of this invention to provide an improved method of operating a freezer vessel.

It is a still further object of this invention to provide an improved and economical separation apparatus wherein the quantity of washing fluid required for adequate separation is minimized.

It is a still further object of this invention to provide an improved method for operating a separation column.

A preferred form of this invention comprises a generally vertically disposed freezer vessel into which solution is introduced through a plurality of submerged spray nozzles which fountain solution and slurry upwardly in the interior of the freezer vessel. Means 37, such as a compressor or an absorber vessel, are provided to maintain the freezer vessel at substantially the vapor pressure of the solution therein. The freezer vessel has an inner wall extending over a substantial portion of its vertical height which comprises a flexible elastomeric liner. A pressure chamber is provided between the elastomeric inner wall and the shell of the freezer vessel. Additional means are provided to periodically expand the elastomeric inner wall by providing a pulsed pressure in the pressure chamber. As frozen solvent begins to accumulate on the inner elastomeric wall, the pulsed pressure applied to inflate or expand the elastomeric wall inwardly of the freezer vessel dislodges the frozen solvent from the wall before it is able to accumulate in large quantities having a size sufficient to foul the separation system.

The slurry of frozen solvent and solution is then passed to a hydraulic separation column of the type described in the aforementioned copending application. In order to enhance the washing operation in the separation column and consequently reduce quantity of pure solvent which is passed in counterflow relation to the movement of frozen solvent through the separation column, the pressure exerted on the frozen solvent in the column by the slurry is periodically pulsed thereby providing an oscillatory or reciprocatory motion to the frozen solvent in the column.

These and other objects of this invention will become more apparent to those skilled in the art by reference to the following detailed description and drawing wherein:

The FIGURE is a schematic view of a separation system in accordance with the invention.

Referring to the drawing, there is shown a generally upright or vertically disposed freezer vessel 10 and a substantially vertical separation column 11. Freezer vessel 10 comprises a vertical hollow cylindrical shell 12. A header 13 is disposed adjacent the lower portion of freezer vessel 10 and has a plurality of nozzles or submerged jets 14 extending generally upwardly therefrom, the nozzles or submerged jets 14 preferably being located below the surface of solution or slurry in the freezer vessel. Inlet means, such as an inlet conduit 13a, are provided for supplying a solution such as raw sea water or concentrated brine from either separation column 11 or from a system solution inlet. In the illustrated embodiment, two such inlets are shown, inlet 13b admitting raw solution into freezer vessel 10 while inlet 13c admits concentrated solution into freezer vessel 10 from separation column 11. Appropriate valves and pumps (not shown) are employed in the various solution lines to assist in passing fluids therethrough as desired. Appropriate control means may be provided if desired to maintain the level of liquid or slurry in freezer vessel 10 a predetermined short distance above nozzles 14 of header 13.

An overhead outlet or evacuation duct 15 is provided through which solvent vapor such as water may be withdrawn from freezer vessel 10 by a pump or an absorption machine in order to maintain the pressure therein substantially at the vapor pressure of the solution, e.g., brine, within the freezer. This evacuated water vapor may be recovered by condensing it and it may subsequently be used for washing if desired. Preferably, the pressure in freezer vessel 10 is maintained slightly below the vapor pressure of the solution therein at the freezing point of the solution so as to provide a driving force to continuously freeze solvent from the solution in the freezer.

Freezer vessel 10 is provided with a funnel 16 adjacent its lower end and a slurry discharge portion 21 to remove the slurry of frozen solvent and solution which is produced by the vacuum freezing operation carried on in freezer vessel 10.

The interior of freezer vessel 10 is provided with a flexible elastomeric inner wall 17 which may be made of rubber or preferably of a suitable plastic having release properties, to facilitate release of ice or other frozen solvent from it, such as Teflon (polytetrafluoroethylene) or polyethylene. Wall 17 may be generally cylindrical in shape and extends from a region adjacent the upper portion of freezer vessel 10 to a region adjacent the lower portion thereof and is appropriately sealed at its ends to outer wall 12 by any suitable means (not shown) to form a pressure chamber 18 therebetween. A pressure line 19 communicates with the interior of pressure chamber 18 for the purpose of inflating or distending wall 17 inwardly toward interior of freezer vessel 10 to the position shown in the drawing.

Any suitable means may be employed to supply pressure to pressure chamber 18, but it is preferable that the means employed be capable of periodically pulsing the pressure within chamber 18 so that wall 17 is periodically expanded into the interior of the freezer vessel and periodically contracted away from the interior of freezer vessel 10 by reason of its own elasticity or resiliency. The pressure in presure chamber 18 may be periodically reduced to assist the return of wall 17 if desired by any suitable means such as a pump or timed valve.

As shown in the drawing, a slurry pump 20 is provided to pass slurry from slurry discharge portion 21 through a slurry discharge line 22. A check valve 23 is provided for a purpose presently to be described and is in series with slurry discharge line 24 which leads to inlet region 25 of separation column 11.

The function and operation of hydraulic separation column 11 is described in detail in the aforementioned copending application and will be only briefly described herein. Basically, separation column 11 is of the hydraulic type and comprises a vertical shell 26 having an inlet region 25 which may comprise a generally frustro-conical slurry distributor 25a and a substantially horizontal perforated screen 27 extending from the edge of distributor 25a to the interior wall of shell 26. Screen 27 passes solution but serves to block passage of the solid component of the slurry. The slurry distributor shown is more or less schematic and it will be understood that any suitable slurry distributor may be provided in separation column 11.

Slurry from freezer vessel 10 is passed to separation column 11 through slurry discharge line 24. A solution discharge line 31 is provided for removing separated solution from the separation column. The excess liquid solution which is withdrawn through screen 27 and line 31 from separation column 11 creates a pressure drop through the slurry in the inlet region 25, 25a of the column which in turn gives rise to a hydraulic pressure differential on the mass of frozen solvent which is supplied to the column from the slurry and thereby consolidates and forces the frozen solvent upwardly through the shell of the column.

Adjacent the upper portion of separation column 11 is disposed a header 32 having a plurality of nozzles 33 for discharging a washing fluid over the surfaces of the frozen solvent passing upwardly in the separation column. Nozzles 33 may be incorporated into a scraper assembly 28 if desired. Scraper 28 is driven by a motor 29 and comprises a plurality of blades which scrape a portion of frozen solvent, e.g., ice, from the top of separation column 11 and passes it to a chute 30 from which the frozen solvent is delivered to a suitable collecting vessel (not shown). The washing fluid discharged from nozzles 33 passes downward through separation column 11 in counterflow to the upward movement of frozen solvent in the column. The washing fluid serves to displace solution, which tends to adhere tenaciously to the surfaces and in the interstices of the frozen solvent, by a diffusion mechanism and, therefore, effects more efficient separation of the frozen solvent and the adhering solution.

Some portion of the solution and diluted washing fluid which is withdrawn from separation column 11 may be passed through inlet line 13c to header 13 where it is reintroduced into freezer vessel 10 through submerged nozzles 14 to maintain the desired degree of liquidity of slurry within the freezer vessel.

To enhance the washing action of the washing fluid which passes in counterflow relation to the movement of frozen solvent through separation column 11, means are provided to pulse the hydraulic pressure applied to the frozen solvent in the separation column. In the illustrated embodiment, this is conveniently achieved by employing a slurry pump of the reciprocating type wherein a reciprocating piston 35 withdraws slurry from freezer vessel 10 and passes it through check valve 23 to the separation column. As the reciprocating piston 35 of slurry pump 20 builds up sufficient pressure in the slurry to open check valve 23, a momentary pulse of relatively high hydraulic pressure is applied to the ice in the separation column to produce a pulse-like movement of the ice. Check valve 23 prevents slurry from being withdrawn from the column on the reverse stroke of the piston of pump 20. Meanwhile, the hydraulic pressure applied to separation column 11 is gradually decreased by withdrawal of brine solution from the column. This causes a slight settling or reverse movement of the ice in the separation column until check valve 23 is again opened by the pressure of slurry supplied to it by slurry pump 20. The result is a slight oscillatory movement of ice in the separation column with respect to the washing fluid therein which tends to provide more efficient replacement of solution adhering to the surfaces and in the interstices of the frozen solvent by the pure solvent washing fluid. The rate of diffusion of solute in the adhering solution to the relatively pure solvent is therefore desirably increased and the washing action thereby enhanced.

As shown in the drawing, the enhancement of the washing action in separation column 11 is provided by the forward stroke of reciprocating piston 35 of slurry pump 20. Pressure line 19 is connected to the reverse side of the closed piston chamber of pump 20 so that on the reverse stroke of the piston, chamber 18 is pressurized and elastomeric wall 17 is bowed inwardly into freezer vessel 10 by the differential pressure across it to dislodge accumulated ice therefrom in small particles which then fall into the lower portion of the freezer vessel and become part of the slurry. If desired, some type of pressure relief vent may be provided in chamber 18 though this is not necessarily essential since the forward stroke of the piston of pump 20 will tend to reduce the pressure in chamber 18 to permit wall 17 to return to its relaxed position against the wall of shell 12. The absolute pressure applied to the exterior of wall 17 need not be great if freezer vessel 10 is operated at a high vacuum on its interior as in the case of the saline water conversion system described.

A suitable level control may be employed to govern the rate of discharge of brine into the freezer vessel. The remaining portion from separation column 11 is discharged to waste through line 36.

While the illustrated embodiment has been described with reference to use of a reciprocating slurry pump and a check valve to periodically pulse the pressure applied to separation column 11, it will be understood that any suitable type of pump as for example, a centrifugal pump may be employed to achieve the desired result. While a reciprocating piston pump is a convenient type of slurry pump because of the natural pulse effect of the reciprocating piston, it will be understood that because of the operation of check valve 23 any pump may be employed to build up a pressure behind the check valve to operate it and momentarily pulse the solid component in separation column 11. Likewise, any desired means may be employed to pulse elastomeric liner in freezer vessel 10 but that the combination of a slurry pump to pulse the column and to pulse the elastomeric liner is highly advantageous. Likewise, other means may be employed to pulse the separation column. For example, a time pulsed valve may be employed in the slurry discharge line so as to increase or decrease the hydraulic pressure applied to the solid component in the separation column at regularly timed intervals. A further alternative is to vary at timed intervals, the level of slurry in the freezer vessel or a timed pulse valve may be inserted in the solution discharge line 31 from the separation column to achieve this result. However, as has been pointed out it is advantageous but not necessary to combine the means to pulse the freezer wall with the means to pulse the separation column and the means to pass slurry from the freezer vessel to the separation column into a single mechanism such as a reciprocating pump.

While the separation system described has been specifically illustrated with reference to a system for the recovery or sweetening of saline water wherein the frozen solvent comprises the desired product, it will be understood that such a system is readily adaptable to the separation of any solution of a solvent and solute whether the desired end product of the system be the solid or solute or both.

While for purposes of illustration of the invention a specific construction has been set forth, it is to be understood that the method and system herein described may be otherwise embodied in different apparatus and in different forms including subcombinations and combinations thereof without departing from the principles of this invention as defined in the following claims.

I claim:

1. In a saline water recovery system for sweetening a brine solution, the combination of a freezer vessel for freezing a portion of the water from said brine solution to form a slurry of ice and brine, a hydraulic separation column for separating the ice from the brine, means to pass a slurry of ice and brine from said freezer vessel to the lower end of said separation column under pressure, means to withdraw brine from said separation column adjacent the lower end thereof to create a pressure drop through the ice in the lower end of the separation column in order to provide a hydraulic force to consolidate ice particles in the lower end of said column and to force the consolidated ice upwardly through said column due to the difference of pressure across the mass of consolidated ice, washing means for passing water in counterflow relation to the movement of ice through said separation column to displace brine adhering to the surfaces and in the interstices of said ice, and means to periodically pulse the hydraulic pressure applied to the mass of consolidated ice in said separation column to enhance the washing action therein.

2. A saline water recovery system as defined in claim 1 wherein the means to periodically pulse the pressure applied to said ice comprises a reciprocating piston pump.

3. In a system for the separation of a solvent and a solute from a solution thereof, the combination of a freezer vessel adapted to contain said solution, means to reduce the pressure on said solution in said vessel to substantially the vapor pressure thereof to cool said solution and to cause a portion of said solvent to freeze from said solution thereby forming a slurry of solution and frozen solvent in said freezer vessel, a hydraulic separation column, means for withdrawing said slurry from said freezer vessel and passing it to said separation column, means for creating a hydraulic pressure drop through the frozen solvent in said separation column to consolidate the mass of frozen solvent therein and to move said frozen solvent through said separation column due to said hydraulic pressure being exerted on said mass of frozen solvent, means to pass a washing fluid in counterflow with the movement of frozen solvent through said separation column, and means to pulse the hydraulic pressure applied to the frozen solvent in said column to enhance the washing of frozen solvent in said column.

4. A freezing apparatus for use in a saline water recovery system for sweetening a raw brine solution comprising a freezer vessel, means for introducing raw brine solution into said freezer vessel comprising means to evacuate and maintain the pressure in said freezer vessel slightly below the vapor pressure of the brine solution therein to remove heat from said solution and to freeze a portion of water from the brine thereby forming a slurry of ice and brine in said freezer, said freezer vessel having a wall comprising an elastomeric material on the interior thereof, spray means disposed within the interior of said freezer vessel for discharging brine solution into said interior thereby providing a large surface area of solution for evaporation and freezing to take place, said elastomeric material forming an inner wall of a pressure chamber, and means to periodically pulse the pressure in said pressure chamber to expand and contract said elastomeric wall thereby dislodging accumulated ice therefrom.

5. A method of sweetening saline water which consists in the steps of passing a brine solution to a freezer vessel, evacuating said freezer vessel to a pressure slightly below the vapor pressure of the brine solution therein at its freezing temperature thereby evaporating water from said brine solution, continuously removing said water vapor from said freezer vessel thereby maintaining said vessel at said pressure and freezing ice from said solution, periodically expanding and contracting an elastomeric wall of said freezer vessel to dislodge accumulated ice therefrom, passing a slurry of ice and brine from said freezer vessel to the lower portion of a vertical separation column under pressure, withdrawing brine from said separation column adjacent its lower end to provide a hydraulic force to consolidate said ice and move it upwardly through said separation column, passing a washing fluid downwardly through said separation column in counterflow to the movement of ice therein, and periodically pulsing the pressure of the slurry passed to said separation column to enhance the washing action in said column.

6. A method of operating a separation column which consists of the steps of passing a slurry of solid and liquid components to the separation column under pressure, withdrawing liquid components from the slurry in a manner to consolidate the solid component into a mass in said separation column and to create a hydraulic pressure difference across said mass of consolidated solid component in order to force said mass of solid component through said separation column under pressure in a predetermined direction in order to obtain a relatively high rate of production from said separation column passing a washing fluid through said separation column in counterflow relation to the movement of solid component through said column to wash said solid component free of adhering liquid component, and periodically pulsing the hydraulic pressure applied to said mass of solid component in said separation column to enhance the washing action therein.

7. In a saline water recovery system for sweetening a brine solution, the combination of a freezer vessel for freezing a portion of the water from said brine solution to form a slurry of ice and brine, a hydraulic separation column for separating the ice from the brine, means to pass a slurry of ice and brine from said freezer vessel to the lower end of said separation column under pressure, means to withdraw brine from said separation column adjacent the lower end thereof, washing means for passing water in counterflow relation to the movement of ice through said separation column to displace brine adhering to the surfaces and in the interstices of said ice, means to periodically pulse the pressure applied to the ice in said separation column to enhance the washing action therein, said means to periodically pulse the pressure applied to said ice comprising a reciprocating piston pump, said freezer vessel having a shell and an elastomeric lining cooperating with said shell to form a pressure chamber and said reciprocating piston pump being operatively associated with said pressure chamber to periodically expand said elastomeric lining into said freezer vessel to dislodge accumulated ice therefrom.

8. In a system for the separation of a solvent and a solute from a solution thereof, the combination of a freezer vessel adapted to contain said solution, means to reduce the pressure on said solution in said vessel to substantially the vapor pressure thereof to cool said solution and to cause a portion of said solvent to freeze from said solution thereby forming a slurry of solution and frozen solvent in said freezer vessel, a hydraulic separation column, means for withdrawing said slurry from said freezer vessel and passing it to said separation column, means for applying hydraulic pressure to said separation column to move frozen solvent therethrough in a predetermined direction, means to pass a washing fluid in counterflow with the movement of frozen solvent through said separation column, means to pulse the hydraulic pressure applied to said column to enhance the washing of frozen solvent in said column, said system including a flexible lining in the interior of said freezer vessel, and wherein said means to periodically pulse the hydraulic pressure applied to said column also serves to periodically expand said lining into said freezer vessel to dislodge frozen solvent adhering to said flexible liner.

9. A separation system including a separation column for use in the separation of the solid and the liquid components of a slurry, means to pass slurry to said separation column under pressure to move solid component through said column in a predetermined direction, means to withdraw the liquid component of said slurry from said separation column, means to pass a washing fluid through said column in counterflow to the movement of solid component through said column, and means to pulse the pressure applied to said separation column to enhance the washing action therein, said means to pulse the pressure applied to said separation column comprising a piston pump and a check valve connected in series with said means to pass slurry to the separation column so that reciprocation of the piston in said pump periodically varies the hydraulic pressure exerted by the slurry passed to the separation column.

References Cited in the file of this patent

UNITED STATES PATENTS

| 1,482,227 | Field | Jan. 29, 1924 |
| 2,009,283 | Warner | July 23, 1935 |
| 2,315,762 | Ax et al. | Apr. 6, 1943 |

OTHER REFERENCES

"Carrier Publication," Office of Saline Water Research and Development Progress, report No. 23, pages 1–3 and Figures 1 and 2, January 1959.